(12) United States Patent
Braun et al.

(10) Patent No.: US 10,437,550 B2
(45) Date of Patent: Oct. 8, 2019

(54) DEVICE AND METHOD FOR CONTROLLING AN AUDIO OUTPUT FOR A MOTOR VEHICLE

(71) Applicant: Continental Automotive GmbH, Hannover (DE)

(72) Inventors: Holger Braun, Langgoens (DE); Abdul Khaliq, Giessen (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 15/517,040

(22) PCT Filed: Oct. 8, 2015

(86) PCT No.: PCT/EP2015/073263
§ 371 (c)(1),
(2) Date: Apr. 5, 2017

(87) PCT Pub. No.: WO2016/055569
PCT Pub. Date: Apr. 14, 2016

(65) Prior Publication Data
US 2017/0293464 A1 Oct. 12, 2017

(30) Foreign Application Priority Data
Oct. 9, 2014 (DE) .................. 10 2014 220 520

(51) Int. Cl.
*G06F 17/00* (2019.01)
*G06F 3/16* (2006.01)
(Continued)

(52) U.S. Cl.
CPC .............. *G06F 3/165* (2013.01); *B60Q 9/00* (2013.01); *B60W 50/14* (2013.01); *G06F 21/84* (2013.01);
(Continued)

(58) Field of Classification Search
CPC ........ B60W 2050/143; B60W 2050/14; B62D 15/029; G08G 1/168
See application file for complete search history.

(56) References Cited

U.S. PATENT DOCUMENTS

2005/0018860 A1 1/2005 Furge et al.
2005/0209719 A1 9/2005 Beckert et al.
(Continued)

FOREIGN PATENT DOCUMENTS

CN 1738491 A 2/2006
CN 101257787 A 9/2008
(Continued)

OTHER PUBLICATIONS

International Search Report and Written Opinion dated Dec. 11, 2015 from corresponding International Patent Application No. PCT/EP2015/073263.

(Continued)

*Primary Examiner* — Thomas H Maung

(57) ABSTRACT

The invention relates to a device for controlling an audio output for a motor vehicle. The device comprises the following: an output summation device for controlling a playback of generated audio output signals on the basis of first audio signals and second audio signals; a first processor device which has at least one processor core and which is designed to generate the first audio signals for a first motor vehicle component group assigned to the first processor device; and a second processor device which has at least one processor core and which is designed to generate second audio signals for a second motor vehicle component group assigned to the second processor device and to actuate the output summation device.

6 Claims, 1 Drawing Sheet

(51) Int. Cl.
  *H04S 1/00* (2006.01)
  *G06F 21/84* (2013.01)
  *B60Q 9/00* (2006.01)
  *B60W 50/14* (2012.01)
  *G08G 1/16* (2006.01)
  *G05B 19/00* (2006.01)

(52) U.S. Cl.
  CPC ............... *H04S 1/00* (2013.01); *G05B 19/00* (2013.01); *G08G 1/168* (2013.01)

(56) References Cited

U.S. PATENT DOCUMENTS

2008/0258253 A1* 10/2008 Fey ................. G05B 9/03
  257/500

2014/0067192 A1* 3/2014 Yousuf ............. B60W 50/029
  701/31.4
2015/0256276 A1* 9/2015 Jones ................ H04H 20/59
  455/3.01

FOREIGN PATENT DOCUMENTS

| | | |
|---|---|---|
| DE | 10124027 A1 | 11/2002 |
| DE | 102006008958 A1 | 9/2006 |
| DE | 102010002092 A1 | 12/2010 |
| DE | 102011003013 A1 | 7/2012 |
| DE | 102012015527 A1 | 2/2014 |
| FR | 2963980 A1 | 2/2012 |

OTHER PUBLICATIONS

Office Action dated Oct. 6, 2015 from corresdponding DE Application No. 102014220520.4.

* cited by examiner

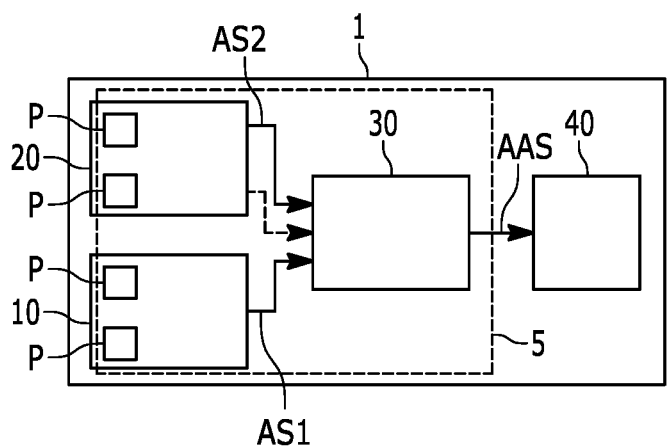
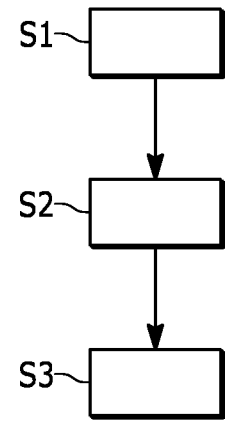
FIG. 1    FIG. 2
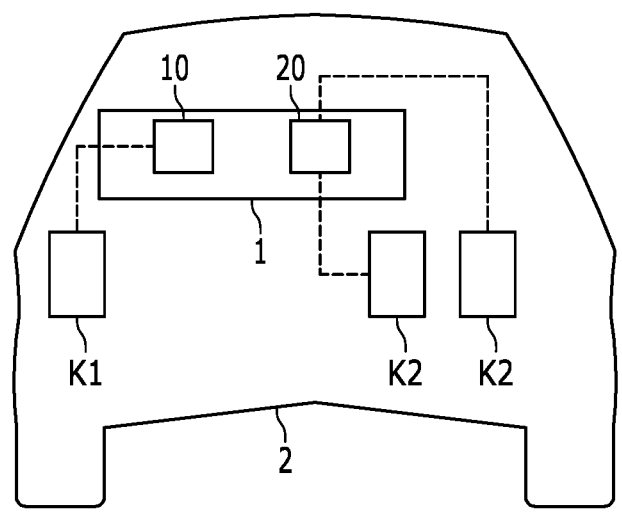
FIG. 3

DEVICE AND METHOD FOR CONTROLLING AN AUDIO OUTPUT FOR A MOTOR VEHICLE

BACKGROUND

The present invention relates to audio and sound reproduction systems in the motor vehicle. In particular, the present invention relates to a device and to a method for controlling an audio output for a motor vehicle.

In multicore processor systems there exist both functionally safe audio signals and audio signals that are not related to functional safety, as defined generally by part of the ISO standard ISO 26262 and a classification according to the Automotive Safety Integrity Level, ASIL for short, which is a risk classification for the functional safety of automobiles.

BRIEF SUMMARY

The object of the present invention is to provide an improved device and an improved method for controlling an audio reproduction for a motor vehicle.

This object is achieved by the subject matter of the independent claims. Embodiments and developments can be found in the dependent claims, the description and the figures.

A first aspect of the present invention relates to a device for controlling an audio output for a motor vehicle, which device comprises: an output summation device for controlling playing of generated audio signals based on first audio signals and second audio signals; a first processor device, which comprises at least one processor core and is designed to generate the first audio signals for a first group of motor vehicle components, which group is assigned to the first processor device; and a second processor device, which comprises at least one processor core and is designed to generate the second audio signals for a second group of motor vehicle components, which group is assigned to the second processor device, and to control the output summation device.

The term "processor device" as used by the present invention includes, for example, a functional unit or subunit of a processor or of a system-on-chip. For instance, the term "processor device" can be used to refer to a single processing core or a single audio mixer or another functional unit.

The present invention advantageously allows integration of safety functions and non-safety-related functions in one system on-chip, or SoC for short.

In the system-on-chip, or in the device of the present invention, the elements needed for the functions, for example first processor device, second processor device and output summation device, can be arranged and functionally interconnected in the processor architecture used such that the freedom from interference required by ISO 26262 can be achieved.

According to another, second aspect of the present invention, an audio system for a motor vehicle is provided, wherein the audio system comprises a device according to the first aspect or according to any embodiment of the first aspect.

According to another, third aspect of the present invention, a method is provided for controlling an audio output for a motor vehicle, which method comprises the following method steps: generating first audio signals for a group of motor vehicle components, which group is assigned to the first processor device; generating second audio signals for a second group of motor vehicle components, which group is assigned to the second processor device; and controlling playing of the generated audio output signals based on the first and second audio signals.

The present invention advantageously allows an audio mixer or output summation device to be integrated in a multicore processor system. At least one core in the multicore processor system is designed for functional safety. This functionally safe core is also responsible for generating the safety-related audio signals.

Entertainment audio signals can be provided by another core. Only the functionally safe core is allowed to control the integrated audio mixer, thereby ensuring that the safety-related audio signals are output reliably.

The present invention advantageously provides integration of an audio mixer controlled in a functionally safe manner in a multicore system and allows savings on external components in a multimedia or audio system having a functional safety requirement. The audio paths from non-ASIL-certified audio sources can thereby advantageously be separated from other audio paths from ASIL-certified audio sources up to arrival at the shared-use audio output device.

The freedom from interference for mixed ASIL systems stipulated in DIN 26262 can be satisfied by this measure.

Advantageous embodiments of the invention are characterized in the dependent claims.

In an advantageous embodiment of the present invention, the first processor device is designed to generate audio signals that are not safety-related as the first audio signals.

This can advantageously ensure that the audio system has a reliability that satisfies the safety requirements.

In another advantageous embodiment of the present invention, the second processor device is designed to generate safety-related audio signals as the second audio signals. This can advantageously ensure that safety-related audio signals are output. This can also advantageously ensure the freedom of interference stipulated in DIN 26262.

In another advantageous embodiment of the present invention, the device is designed to classify vehicle components according to ASIL risk levels into vehicle components of the first group, which generate first audio signals, which are not safety-related, and into vehicle components of the second group, which generate safety-related second audio signals.

In another advantageous embodiment of the present invention, the second processor device is designed to restrict playing of the audio signals based on the first audio signals for the first group of the vehicle components.

The described embodiments and developments can be combined with one another in any way.

Further possible embodiments, developments and implementations of the present invention also include combinations of features of the invention that are described above or below with regard to exemplary embodiments, even if these combinations are not mentioned explicitly.

BRIEF DESCRIPTION OF THE DRAWINGS

The accompanying drawings are intended to provide greater understanding of the embodiments of the present invention. The accompanying drawings illustrate embodiments and are used in conjunction with the description to explain concepts of the present invention.

Other embodiments and many of the stated advantages are apparent from the drawings. The depicted elements are not necessarily shown to scale in the drawings, in which:

FIG. 1 is a schematic diagram of a device for controlling an audio output for a motor vehicle according to an embodiment of the present invention;

FIG. 2 is a schematic flow diagram of a method for controlling an audio output for a motor vehicle according to another embodiment of the present invention; and FIG. 3 shows for the purpose of explaining the invention a schematic diagram of a motor vehicle.

DETAILED DESCRIPTION

In the figures of the drawings, unless otherwise stated, the same reference signs denote elements, devices, components or method steps that are identical or have the same function.

Although the present invention has been described above with reference to preferred exemplary embodiments, it is not restricted to these embodiments but can be modified in a variety of ways. In particular, the present invention can be altered or modified in many different ways without departing from the essence of the present invention.

FIG. 1 is a schematic diagram of a device for controlling an audio output for a motor vehicle according to an embodiment of the present invention.

A device 1 for controlling an audio output for a motor vehicle 2 comprises, for example, an output summation device 30, a first processor device 10, a second processor device 20 and an acoustic transducer 40.

The device 1 can be incorporated in an audio system 5 for the motor vehicle 2.

The audio system 5 constitutes a processor unit, also known as a "system-on-chip" or SoC for short. This means that the first processor device 10, the second processor device 20 and the output summation device 30 are integrated in a processor, for example.

The output summation device 30 is, for example, an audio mixer for controlling playing of generated audio output signals AAS based on first audio signals AS1 and second audio signals AS2.

The output summation device 30 does not have a separate processing core, for example.

The first processor device 10 comprises, for example, at least one processor core P and is designed, for example, to generate the first audio signals AS1 for a first group of vehicle components K1, which group is assigned to the first processor device 10.

The second processor device 20 comprises, for example, at least one processor core P and is designed, for example, to generate second audio signals AS2 for a second group of motor vehicle components K2, which group is assigned to the second processor device 20, and to control the output summation device 30.

For example, the first processor device 10 is designed to generate audio signals that are not safety-related as the first audio signals AS1.

Radio, music-output or entertainment audio signals, for example, can be used as the first audio signals AS1 for playing, which are not safety-related.

In addition, directions given by a vehicle navigation system or weather information from weather monitoring or weather forecasting systems can be used as the first audio signals AS1, which are not safety-related, to be played. Information on malfunctions from other vehicle components or warnings from electronic driver assistance systems, traffic reports and traffic announcements from a car radio or from a radio receiver developed for installing in a motor vehicle can be used, for example, as the safety-related second audio signals AS2 to be played.

For example, the second processor device 20 is designed to generate audio signals that are safety-related as the second audio signals AS2.

The first processor device 10 and the second processor device 20 are embodied as a multicore processor, for example, and are designed, for instance, in the form of a microprocessor having more than one complete main core processor or processor core P in a chip or in a chip combination or chipset.

In addition, the output summation device 30 is integrated on the same chip, for instance.

There are, for example, multiple instances of microprocessor resources in the form of processor cores P in the first processor device 10 and in the second processor device 20.

The individual processor cores P have dedicated register sets and arithmetic logic units, ALU, for instance.

The processor cores P are in the form of an 8-bit, 16-bit, 32-bit or 64-bit RISC processor, for example. A RISC processor can denote a Reduced Instruction Set Computing CPU or RISC CPU, which has a simplified set of instructions.

The first processor device 10 and the second processor device 20 can be designed to execute individual software modules in parallel.

In other words, individual computer programs can be executed in parallel on the first processor device 10 and/or on the second processor device 20, with the individual program segments being synchronized in parallel.

The acoustic transducer 40 can comprise, for example, a loudspeaker or a multiplicity of loudspeakers, and be used as a transducer that converts electrical signals, for instance the audio output signals AAS, into mechanical vibrations or sound.

The acoustic transducer 40 can be used for generating sound in the frequency spectrum audible to humans (approximately 20 Hz to 20,000 Hz). The design and size of the acoustic transducer 40 vary depending on the required volume and audio range.

FIG. 2 is a schematic flow diagram of a method for controlling an audio output for a motor vehicle.

Said method comprises the following steps:

as a first step of the method, generating S1 first audio signals AS1 for a first group of motor vehicle components K1, which group is assigned to the first processor device 10;

as a second step of the method, generating S2 second audio signals AS2 for a second group of motor vehicle components K2, which group is assigned to the second processor device 20;

as a third step of the method, controlling S3 the playing of the generated audio output signals AAS based on the first audio signals AS1 and the second audio signals AS2.

FIG. 3 shows for the purpose of explaining the invention a schematic diagram of a motor vehicle.

The motor vehicle 2 comprises, for example, an audio system 5 for the motor vehicle 2, which audio system 5 comprises a device 1 for controlling an audio output for a motor vehicle.

The motor vehicle 2 also comprises, for example, a first group of motor vehicle components K1, which are assigned to a first processor device 10.

The first group of motor vehicle components K1 may comprise, for example, external media reproduction devices such as, for instance, CD changers, smartphones, tablets or other multimedia devices.

The motor vehicle 2 also comprises, for example, a second group of motor vehicle components K2, which are assigned to a second processor device 20.

The second group of motor vehicle components K2 can comprise, for example, driver assistance systems such as a control module for a parking assistant, a control module for a lane-change assistant or a control module for a "blind-spot assistant".

Although the present invention has been described above with reference to preferred exemplary embodiments, it is not restricted to these embodiments but can be modified in a variety of ways. In particular, the invention can be altered or modified in many different ways without departing from the essence of the present invention.

In addition, it should be mentioned that the terms "comprising" and "having" do not exclude any other elements or steps, and "a" or "an" does not rule out more than one.

It should also be pointed out that features or steps that have been described with reference to one of the above exemplary embodiments can also be used in combination with other features or steps of other exemplary embodiments described above. Reference signs in the claims shall not be deemed to have a limiting effect.

The invention claimed is:

1. Apparatus comprising:
 a system-on-chip for controlling an audio output for a motor vehicle, the system-on-chip including:
   an output summation device for controlling playing of audio output signals generated from first audio signals and second audio signals, the output summation device having no processor cores;
   a first processor device, which comprises a plurality of processor cores and that is designed to generate the first audio signals for a first group of motor vehicle components that are non-ASIL (Automotive Safety Integrity Level)-certified audio sources, the first group being assigned to the first processor device, which is designed to generate audio signals that are not safety-related as the first audio signals;
   a second processor device, which comprises a plurality of processor cores and that is designed to generate the second audio signals for a second group of motor vehicle components that are ASIL-certified audio sources, the second group being assigned to the second processor device, which is designed to generate safety-related audio signals as the second audio signals;
 wherein solely the second processor device is designed to control the output summation device such that the system-on-chip generates both safety-related audio signals and non-safety-related audio signals thereby allowing cost savings on components external to the system-on-chip in an audio system having a functional safety requirement and thereby creating a first audio path on the system-on-chip for the non-ASIL-certified audio sources that is separate from a second audio path on the system-on-chip for the ASIL-certified audio sources up to arrival at a shared audio output device such that the system-on-chip satisfies freedom from interference for mixed ASIL systems stipulated in DIN ("Deutsches Institut für Normung" which means "The German Institute for Standardization") 26262; and
 wherein the first processor device, the second processor device, and the output summation device are integrated on a single chip.

2. The apparatus of claim 1, wherein the device is designed to classify vehicle components according to Automotive Safety Integrity Level risk levels into vehicle components of the first group, which generate first audio signals, which are not safety-related, and into vehicle components of the second group, which generate safety-related second audio signals.

3. The apparatus of claim 1, wherein the second processor device is designed to restrict playing of the audio output signals based on the first audio signals for the first group of the motor vehicle components.

4. The apparatus of claim 2, wherein the second processor device is designed to restrict playing of the audio output signals based on the first audio signals for the first group of the motor vehicle components.

5. A method comprising:
 controlling a system-on-chip for an audio output in a motor vehicle, by performing operations including:
   generating, in a first multicore processor device of the system-on-chip, first audio signals, which are assigned to a first group of motor vehicle components;
   generating, in a second multicore processor device of the system-on-chip, second audio signals, which are assigned to a second group of motor vehicle components; and
   controlling an output summation device of the system-on-chip, the output summation device having no processor cores and being configure to play audio output signals generated from the first audio signals and the second audio signals, the controlling being performed solely by the second processor device such that the system-on-chip generates both safety-related audio signals and non-safety-related audio signals thereby allowing cost savings on components external to the system-on-chip in an audio system having a functional safety requirement and thereby creating a first audio path on the system-on-chip for the non-ASIL (Automotive Safety Integrity Level)-certified audio sources that is separate from a second audio path on the system-on-chip for the ASIL-certified audio sources up to arrival at a shared audio output device such that the system-on-chip satisfies freedom from interference for mixed ASIL systems stipulated in DIN ("Deutsches Institut für Normung" which means "The German Institute for Standardization") 26262; and
 wherein the first multicore processor device, the second multicore processor device, and the output summation device are integrated on a single chip.

6. The method of claim 5, wherein the vehicle components are classified according to Automotive Safety Integrity Level risk levels into vehicle components which generate first audio signals, which are not safety-related, and into vehicle components which generate safety-related second audio signals.

* * * * *